May 12, 1925.
J. C. WANGEN
PENCIL SHARPENER
Filed Sept. 15, 1923
1,537,394
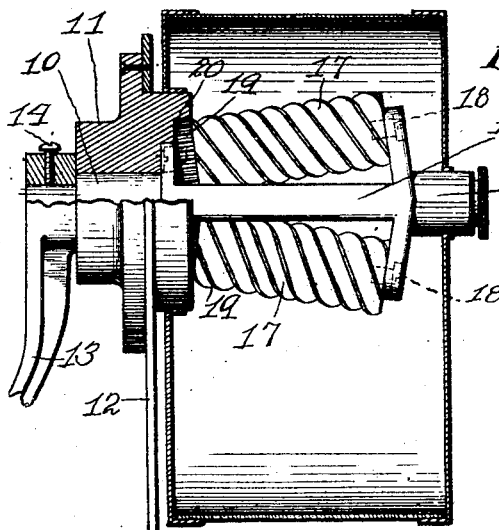
Inventor
Joseph Carl Wangen.
Attorney Patented May 12, 1925.

1,537,394

UNITED STATES PATENT OFFICE.

JOSEPH CARL WANGEN, OF GREAT FALLS, MONTANA.

PENCIL SHARPENER.

Application filed September 15, 1923. Serial No. 662,955.

*To all whom it may concern:*

Be it known that I, JOSEPH CARL WANGEN, a citizen of the United States, residing at Great Falls, in the county of Cascade and State of Montana, have invented certain new and useful Improvements in Pencil Sharpeners, of which the following is a specification.

My invention relates to improvements in pencil sharpeners of the type which employ rollers to sharpen the pencil.

In the use of this type of pencil sharpeners, the knives on the rollers become dull at the place where the lead of the pencil contacts with the knives which is at the end of the roller. When this occurs, the rollers must be replaced, although the other ends of the rollers are still serviceable.

The object of my invention is to overcome this difficulty by providing a roller which can be used until both ends have become dull.

Another object of the invention is to provide a roller for pencil sharpeners which is cheaper to manufacture, and is strong and durable.

Other objects and advantages of the invention will be apparent during the course of the following description.

In the accompanying drawings forming a part of this specification, and in which like numerals are employed to designate like parts throughout the same, Figure 1 is a side elevation of a pencil sharpener of the usual construction having my improved rollers attached thereto, parts being in section, Figure 2 is a similar view showing the rollers in their reversed position, Figure 3 is a longitudinal sectional view through the roller and cog, and, Figure 4 is a perspective view of the cog.

In the drawings, wherein for the purpose of illustration I have shown the preferred embodiment of my device, the numeral 10 designates the main shaft which is journaled in the bearing block 11 which, in turn, is carried by the support member 12. The shaft 10 is turned by means of the handle 13 which is rigidly attached thereto by means of the set screw 14. The roller supporting member 15 is mounted on the shaft 10 and carries the tubular extension 16 which receives and supports the pencil to be sharpened. Rollers 17 are detachably carried by the member 15 by means of the bolts 18 or any other suitable means. These rollers diverge from the bearing block 11 and carry cogs 19 on the ends adjacent the block 11 which engage an internal gear 20 carried by the block 11 and which is stationary. When the shaft 10 is turned by means of the handle 13, the rollers are revolved by means of the gear 20 and cogs 19.

The construction thus far is of the usual construction. In carrying out my invention the cog 19 is formed with a stud 21 which fits into the central bore 22 of the roller 17. Arranged about the stud 21 are pins or prongs 23 which are shown as formed integral with the cog but which might be made separately and attached by means of drilled holes in the cog, or the like. Arranged about the bore 22 of the roller, are openings 24 of the same number as the pins 23 and which are adapted to snugly receive the said pins. Similar openings 25 are formed on the opposite end of the roller 17.

In operation, the cog is attached to the roller by means of the stud 21 and the pins 23, which keep the cog from turning with respect to the roller. When the roller becomes worn at the end carrying the cog, the cog is detached and placed on the opposite end of the roller, with the pins 23 engaging the openings 25. The roller is then reversed and placed in the pencil sharpener, as before. The rollers are now ready for use but the handle must be turned in the reverse direction to make a cut.

It will be seen that by this arrangement it is possible to make use of both ends of the cutting rollers, and thereby lengthen their use to that extent. In manufacturing the rollers, they are made separately from the cog and when a roller is replaced the same cog can be used, if desired. This cheapens the manufacture of the roller and consequently, the cost.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, what I claim is:

1. In a device of the character described, a cutting roller, a cog adapted to be arranged in end to end relation with either end of the cutting roller and in contact therewith, and means for effecting a detachable locking engagement between the cog and the adjacent end of the roller.

2. In a device of the character described, a rotatable carrier, a cutting roller mounted therein, a cog adapted to be arranged in contact with either end of the roller whereby it may be reversed, said roller and cog having detachable interlocking parts, and means engaging the cog to rotate it upon its axis upon the rotation of the carrier.

3. In a device of the character described, a cutting roller having openings in both of its ends, a cog, pins carried by the cog and adapted for engagement with the openings in either end of the roller.

4. In a device of the character described, a roller having a central longitudinal bore and openings in its ends, arranged about the bore, a cog, a stud carried by the cog and adapted for insertion within the bore, and pins secured to the cog and arranged about the stud and adapted for engagement with the openings in either end of the roller, whereby the cog is capable of attachment to either end of the roller.

In testimony whereof I affix my signature.

JOSEPH CARL WANGEN.